J. A. Woodbury.
Planing Mach.
No. 444. Reissued Mar. 31, 1857.
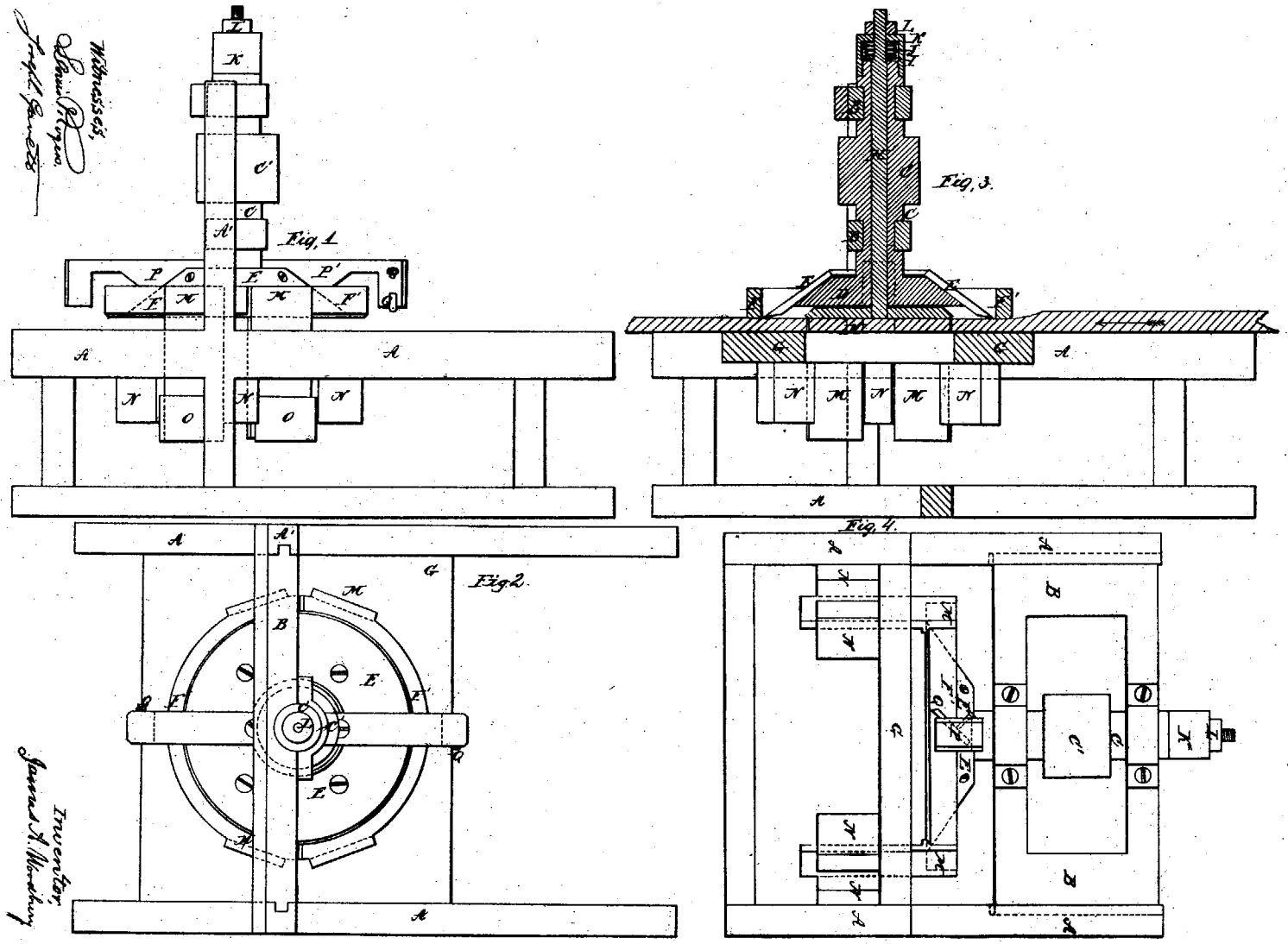
Witnesses,
Louis Pilgrim
Joseph Gavette
Inventor,
James A. Woodbury
N. PETERS, PHOTO-LITHOGRAPHER, WASHINGTON, D.C.

UNITED STATES PATENT OFFICE.

JAMES A. WOODBURY, OF WINCHESTER, MASSACHUSETTS.

IMPROVEMENT IN PLANING-MACHINES.

Specification forming part of Letters Patent No. 10,512, dated February 7, 1854; Reissue No. 444, dated March 31, 1857.

*To all whom it may concern:*

Be it known that I, JAMES A. WOODBURY, of Winchester, in the county of Middlesex and State of Massachusetts, have invented certain new and useful Improvements in Machines for Planing Boards and for other Similar Purposes; and I do hereby declare that the following is a full, clear, and exact description of the nature and operation thereof, taken in connection with the accompanying drawings, making part of this specification.

The subject-matter of my invention relates to a new and improved arrangement of the cutting apparatus in a machine for planing boards, planks, &c.; and it consists, in the first place, in the employment of a "rotary disk-cutter," so called, which is made with a cutting-edge around its periphery, concentric with the axis of rotation, and is arranged to rotate in the plane of the surface of the board to be planed, in combination with a bed upon which the board rests and certain devices by which the board is held down upon the bed, and which also act as a mouth-piece to hold the fibers of the material firm under the operation of the disk-cutter.

The second part of my invention consists in combining the "Bramah wheel," so called, with the rotating disk-cutter, for the purpose of removing the surplus material before it is acted upon by the disk-cutter to finish its surface.

Figure 1 of the drawings is a side elevation. Fig. 2 is a plan. Fig. 3 is a vertical longitudinal section through the middle; and Fig. 4, an end elevation of that part of a planing-machine to which my improvements relate.

The letters refer to like parts in all the figures.

A A, &c., is the frame of the machine. It is provided with two upright posts, A′, upon either side thereof, between which the frame B is placed, which is made to move up and down, being guided in grooves in the posts, as shown, or in any other convenient manner. The frame B is provided with proper bearings to carry the vertical shaft C. This shaft receives the driving power by the pulley C′, and at its lower end it carries the cutter-stock D, upon which the circular cutters E are fastened. The cutter-stock is made in the form of a frustum of a cone, and the cutters E are made in segments of a funnel-formed shape, as shown, to fit the stock. The lower edges of the cutters are ground so as to make the edges thereof in the circumference of a circle concentric with the shaft and in the same plane.

F F′ are pressure-bars which surround the disk-cutter, and serve to hold the board firmly upon the bed G, which extends across the frame A beneath the cutter and supports the board in the act of planing. The bar F′ also acts as a mouth-piece to the disk-cutter, to confine the fibers of the wood at the point of cutting, and prevent the tearing up or splitting of the surface and leaving it rough.

H is a pressure-plate within the disk-cutter, for the purpose of assisting to hold the material to be planed when it is flexible or limber. It is attached to a spindle, H′, which extends upward through the center of the shaft C, and carries upon its upper end a collar, I, upon which the helical spring J presses, which is coiled within the hollow cap K, screwed upon the upper end of the shaft C, as is shown in section in Fig. 3.

L is a check-nut upon the spindle H′, to prevent the pressure-plate H from falling too low when the board is removed. By the action of the spring J the pressure-plate H is pressed firmly down upon the board in a perfectly obvious manner. The pressure-bars F F′ are attached to the sliding pieces M, which are guided in their vertical movement between the guide-blocks N, and are held down by the weights O, attached thereto, or by some other analogous devices.

P P are arms attached to the shaft C, which extend outward beyond the pressers F F′, and are provided with gage-cutters Q, and operate like the well-known "Bramah wheel," so called.

The devices for carrying the board forward and for adjusting the height of the frame B and the cutters, and also many other minor details of a planing-machine, are neither shown nor described, as they constitute no part of my invention, which may be used with any of the well-known arrangements for such purposes which are in common use in the construction of planing-machines, and therefore I have particularly described those parts only to which my improvements specially pertain.

The operation of the improved machine is as follows: The frame B is adjusted to the proper height, so that the disk-cutter shall be at the required distance from the bed G to give the necessary thickness to the board. The board is fed into the machine in the usual manner, and is carried forward by feeding-rollers or other appropriate device in the direction of the arrow, as shown in Fig. 3. When it arrives at the Bramah wheel, most of the surplus material is removed thereby, and the board is reduced to a uniform thickness. It then passes under the presser F′ and meets the disk-cutter, which, by its rotary motion, in connection with the progressive movement of the board, acts upon it with what is known as a "drawing cut" and removes from its surface a continuous shaving. The fibers of the wood are held during the action of cutting by the presser F′, which presses firmly upon the surface of the board in close proximity to the cutting-edge. This peculiar movement of the cutting-edge is highly favorably to the cutting of the surface smoothly when the grains of the wood run obliquely, and also to offering but little resistance to the progressive movement of the board.

In the planing of clapboards and other similar bodies which are nearly of uniform thickness, the use of the Bramah wheel is not required. It is also proposed to employ the first part of my invention in the splitting and shaving of leather and other similar substances, in which case, also, the Bramah wheel would not be used.

It is obvious that the devices employed may be much modified in form without departing from the principle of my invention, which consists in the combination of devices by which this peculiar mode of cutting is effected.

Having thus described my improvements, I shall state my claims as follows:

What I claim as my invention, and desire to have secured to me by Letters Patent, is—

1. The combination of the rotary disk-cutter with the pressers and bed, substantially in the manner and for the purposes herein described.

2. The combination of the "Bramah wheel," so called, with the rotary disk cutter and its accessories, for the purpose of planing, substantially as herein set forth.

3. The method of planing with a continuing drawing cut, substantially as described.

JAMES A. WOODBURY.

Witnesses:

JOSEPH GAVETT,

LOUIS ROGERS.